United States Patent
White et al.

(10) Patent No.: US 6,819,072 B2
(45) Date of Patent: Nov. 16, 2004

(54) DISK DRIVE SERVO ARM RETRACT AND SPINDLE BRAKE CIRCUIT

(75) Inventors: Bertram J. White, Irvine, CA (US); Kevin W. Ziemer, Huntington Beach, CA (US)

(73) Assignee: Texas Instruments Incorporated, Dallas, TX (US)

( * ) Notice: Subject to any disclaimer, the term of this patent is extended or adjusted under 35 U.S.C. 154(b) by 206 days.

(21) Appl. No.: 09/817,695

(22) Filed: Mar. 26, 2001

(65) Prior Publication Data

US 2002/0074963 A1 Jun. 20, 2002

Related U.S. Application Data

(60) Provisional application No. 60/256,422, filed on Dec. 18, 2000.

(51) Int. Cl.[7] .............................................. G05B 11/01
(52) U.S. Cl. ........................ 318/560; 318/138; 318/254; 318/438; 318/439; 360/73.01; 360/73.02; 360/74.1; 360/75; 360/78.04
(58) Field of Search ................................. 318/739, 254, 318/438, 439, 603, 798, 812, 270, 560; 360/74.1, 75, 78.04, 73.01–73.02

(56) References Cited

U.S. PATENT DOCUMENTS

| | | | |
|---|---|---|---|
| 5,202,614 A | | 4/1993 | Peters et al. |
| 5,202,616 A | | 4/1993 | Peters et al. |
| 5,382,689 A | | 1/1995 | Nomura |
| 5,384,524 A | * | 1/1995 | Romano ..................... 318/569 |
| 5,455,496 A | * | 10/1995 | Williams et al. ............ 318/563 |
| 5,504,402 A | * | 4/1996 | Menegoli ..................... 318/377 |
| 5,566,369 A | * | 10/1996 | Carobolante ................. 360/75 |
| 5,768,045 A | * | 6/1998 | Patton, III et al. ........ 360/78.04 |
| 5,808,436 A | * | 9/1998 | Choi et al. ................... 318/603 |
| 5,834,913 A | * | 11/1998 | Yoshida et al. ............. 318/270 |
| 5,866,998 A | * | 2/1999 | Menegoli ..................... 318/254 |
| 5,936,365 A | | 8/1999 | Li et al. |
| 6,040,671 A | | 3/2000 | Brito et al. |
| 6,081,400 A | * | 6/2000 | Lu et al. ....................... 360/75 |
| 6,084,398 A | | 7/2000 | Howard |
| 6,157,153 A | * | 12/2000 | Uegami et al. ............. 318/364 |
| 6,177,772 B1 | * | 1/2001 | Barua et al. ................ 318/362 |
| 6,198,590 B1 | * | 3/2001 | Codilian et al. ......... 360/73.03 |
| 6,498,446 B1 | * | 12/2002 | Menegoli et al. ........... 318/254 |

* cited by examiner

*Primary Examiner*—David Martin
*Assistant Examiner*—Tyrone Smith
(74) *Attorney, Agent, or Firm*—W. Daniel Swayze, Jr.; W. James Brady; Frederick J. Telecky, Jr.

(57) ABSTRACT

A spindle motor control circuit for controlling a motor; including a control circuit to control the motor during at least a low state, a pulse state and a high state, the motor braking during said low state, the control circuit receiving a flyback voltage from the motor during the pulse state and the control circuit receiving a reduced flyback voltage from the motor during the high state.

5 Claims, 4 Drawing Sheets

DISK DRIVE SERVO ARM RETRACT AND SPINDLE BRAKE CIRCUIT

This application claims priority under 35 USC § 119(e)(1) of provisional application Ser. No. 60/256,422, filed Dec. 18, 2000.

FIELD OF THE INVENTION

The present invention relates to the field of electronic motor control and, more specifically, to a method and apparatus for using back EMF to power electrical circuits and retract a servo arm.

BACKGROUND OF THE INVENTION

Magentic disk devices, such as hard disk drives supporting random access, utilize a spindle that includes a collection of platters. These platters are covered with a magnetic material for recording information. Each platter contains a series of circular recording tracks containing sectors of information that can be read or written to by electromagnetic heads utilizing switchable magnetic fields. The platters of a spindle generally rotate at a constant angular speed when memory sectors are being read or written.

The rotation of a spindle of platters in a hard disk drive is effected by a spindle motor. The motor includes a magnetic rotor rotating in response to an electrical field created by three sets of electric coils.

A disk drive can be spinning with the read/write head out over the data area when there is a power fault. The fault can be as severe as a complete loss of power to the drive. In such a case the servo arm must be retracted to the landing zone before the spindle loses a significant amount of speed. If the arm is not retracted, it can contact the data area and damage either the surface of the disk, the sensor at the end of the arm, or the arm itself.

Some disk drives are manufactured with a latch that locks the head in the retract position once the disk speed drops below a specified minimum level. In some drives a magnet holds the arm in the landing zone. There are other devices that are used to perform this same function. It is desirable to quickly reduce the spindle speed once the arm is in the landing zone regardless of the type of mechanism used to keep the arm there.

Electrical energy is used to start up and maintain the rotation of the spindle in a disk drive. An electrical motor provides the required torque. The momentum that exists can be converted back to electrical energy if the power supply is not available. In order to take advantage of this source of energy, the motor needs to be isolated from the power supply. If it were not isolated, loads connected to that node could quickly drain the motor. When the supply is providing current for the motor in normal operation, the isolation device needs to have low on resistance to minimize power dissipation.

SUMMARY OF THE INVENTION

The present invention reduces the inrush current to the supply capacitor because that capacitor can be relatively small and thus prevents damage to the forward biased diode associated with an isolation device. Additionally, partial braking of the spindle occurs during the retract period. The retract operation of the present invention can occur while back EMF is at a low voltage when the spindle has slowed to a small speed. The present invention used a pulse signal generated by a flyback voltage to achieve a higher voltage to be used in conjunction with the small capacitor.

DETAILED DESCRIPTION OF THE INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 8:
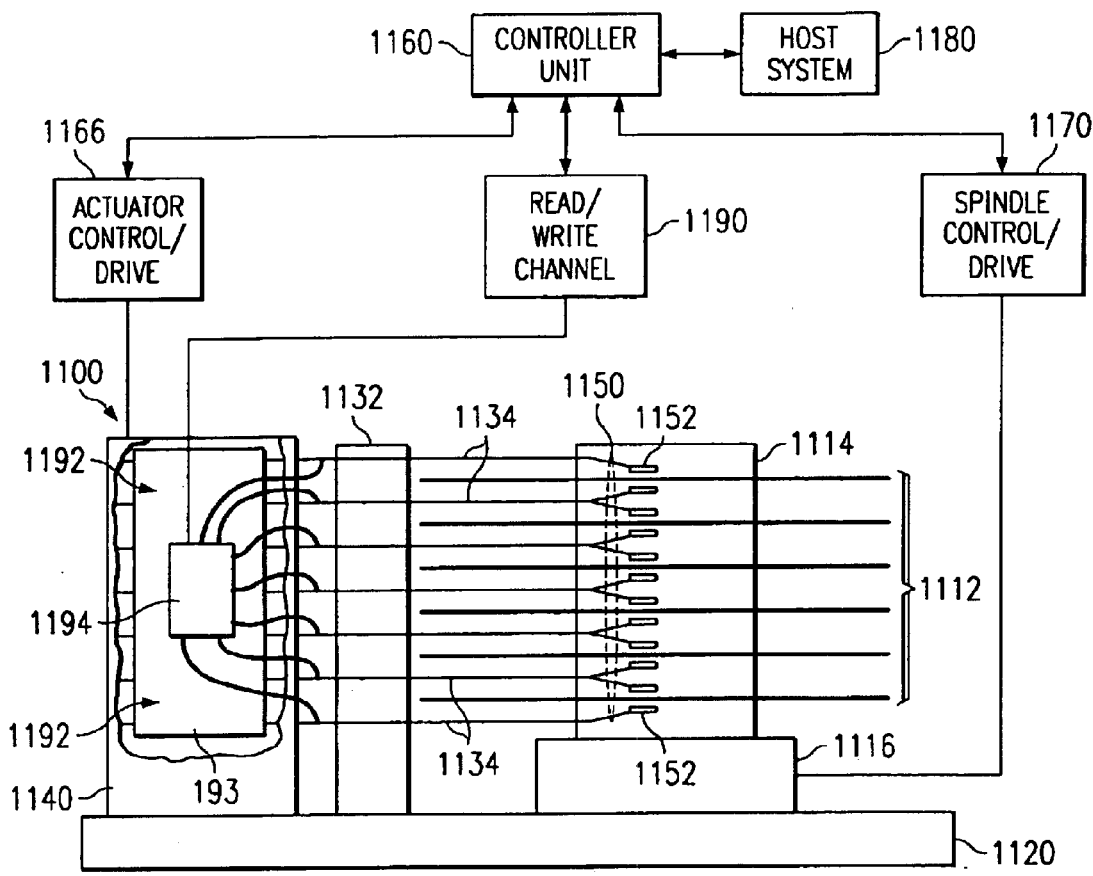
FIG. 8 illustrates a side view of the system of the present invention.
Figure 9:
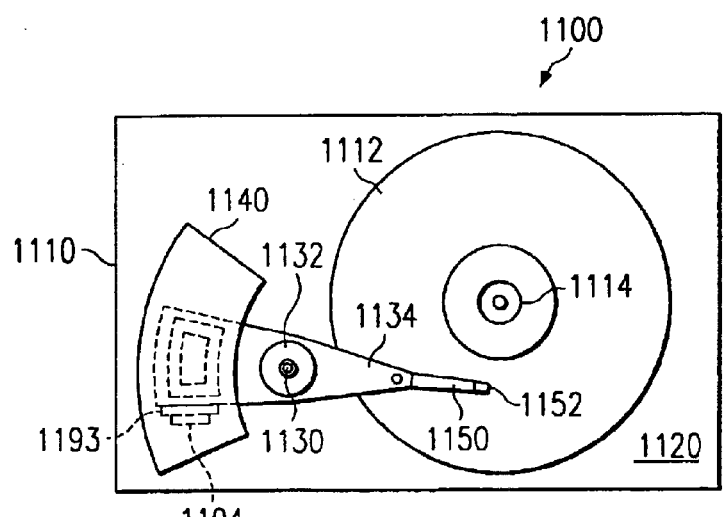
FIG. 9 illustrates a top view of the system of the present invention.

FIGS. 8 and 9 show a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional particulate or thin film recording disk or, in other embodiments, they may be liquid-bearing disks. The spindle 1114 is attached to a spindle motor 1116, which rotates the spindle 1114, and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 1120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166, which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The arm electronics 1192 includes the control circuits of the present invention. The AE unit 1192 includes a printed circuit board 1193, or a flexible carrier, mounted on the actuator arms 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 is coupled via connections in the printed circuit board to the read/write channel 1190 and also to each read head and each write head in the plurality of heads 1152.

The present invention uses a three zone operation for a power fault or other emergency condition. The power fault can vary from a partial loss of power to a complete loss of power. During the first zone of operation, the head motion is stopped. This prepares the head for retract especially if the head is moving away from the retract area. However, regardless of the direction of motion of the head in zone 1, the head is stopped. The operation during zone two is to bring the head back to the landing area. Lastly, the operation during zone 3 is to slow down and stop the spindle motor. The present invention uses a pulsed source of energy, for example, a voltage pulse.

Figure 5:
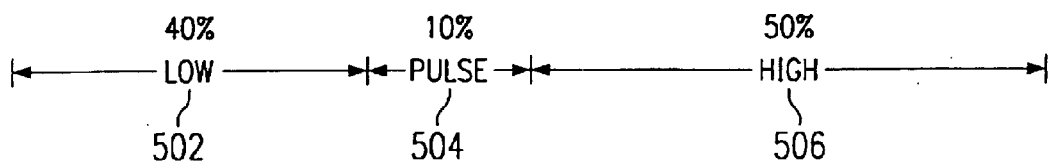
FIG. 5 illustrates the different states during the retract period.

Turning now to FIG. 5, FIG. 5 illustrates three possible states during retract. The low state 502 which corresponds to approximately forty percent (40%) of the time is followed by the pulse state 504, which accounts for ten percent (10%) of the time. Lastly, the high state 506 follows the pulse state 504 and accounts for fifty percent (50%) of the time. These three states correspond to the operation of the VCM control circuit in FIG. 1 and the SPM control circuit illustrated in FIG. 2 retract period. The VCM dynamic brake period to brake and stop the motion of the head occurs before the retract period to retract the head to a land area and the spindle motor dynamic brake 1 occurs after the retract period.

Figure 1:
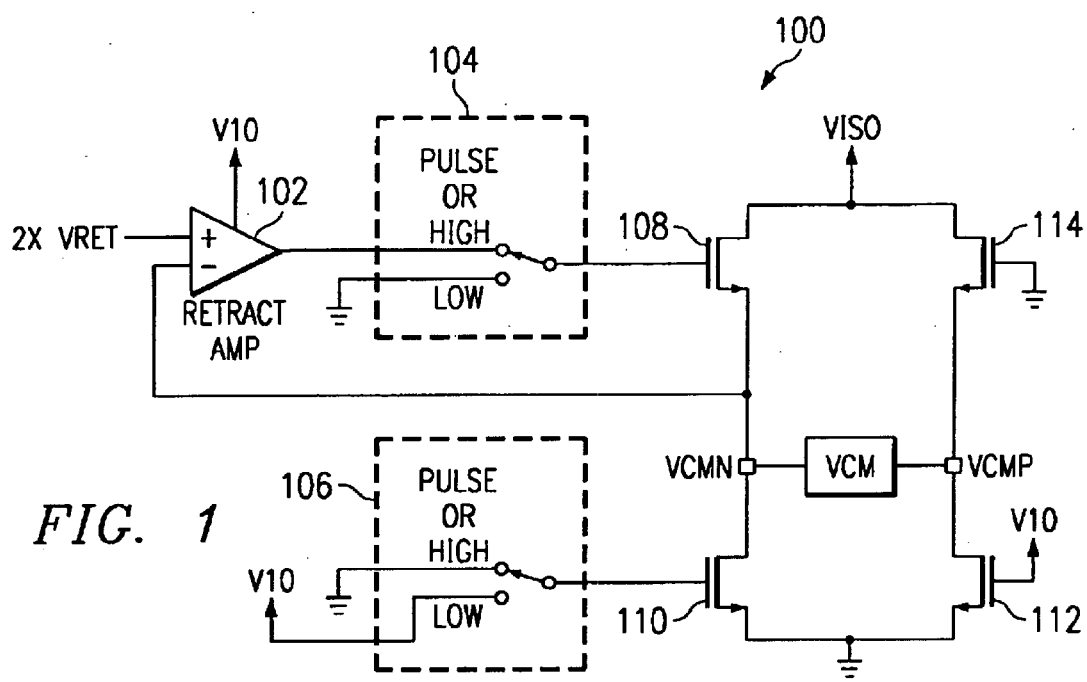
FIG. 1 illustrates a VCM control circuit to retract the VCM.

Turning now to FIG. 1, a voice coil motor (VCM) control circuit 100 includes switches 104 and switch 106 are switch circuits which operate in accordance with a particular state during the retract period. Switch 104 connects the op amp 102 to the NFET 108 during the pulse state or during the high state. During the low state the gate of NFET 108 is connected to ground through switch 104. Likewise, switch 106 during the pulse state or the high period connects ground to the gate of NFET 110. During the low state the gate of NFET 110 is connected to voltage $V_{10}$. The gate of NFET 114 is connected to ground, and the gate of NFET 112 is connected to voltage $V_{10}$. The drain of NFET 108 and the drain of NFET 114 are connected to Voltage $V_{ISO}$. The source of NFET 108 is connected to the VCM motor at terminal $V_{CMN}$. The source of NFET 114 is connected to terminal $V_{CMP}$ at the other end of the VCM motor. The drain of transistor 110 is connected to terminal $V_{CMN}$ and the drain of NFET 112 is connected to the terminal $V_{CMP}$. The source of NFET 110 and the source of NFET 112 are connected to ground. An operational amplifier 102 has a plus input to reveal a set signal $2XV_{RET}$.

The negative input to op amp 102 is connected to the source of NFET 108 and terminal $V_{CMN}$. The output of op amp 102 is connected to switch 104, which during either the pulse or high state connects the output of op amp 102 with the gate of NFET 108. During the low state, the gate of NFET 108 is connected to ground through switch 104. The op amp 102 compares the signal $2XV_{REC}$ with the voltage $V_{CMN}$. Thus, during the pulse or high state terminal $V_{CMN}$ is held at signal $2XV_{RET}$. NFET 112 has a voltage $V_{10}$ applied to the gate, which keeps NFET 112 shorted between drain to source, which keeps the terminal $V_{CMP}$ at ground. The NFET 114 remains open from drain to source because the gate of NFET 114 is connected to ground. Thus, during the low state, the NFET 110 shorts $V_{CMN}$ to ground from source to drain.

Figure 4:
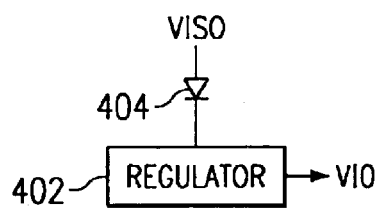
FIG. 4 illustrates a circuit to generate $V_{10}$.
Figure 2:
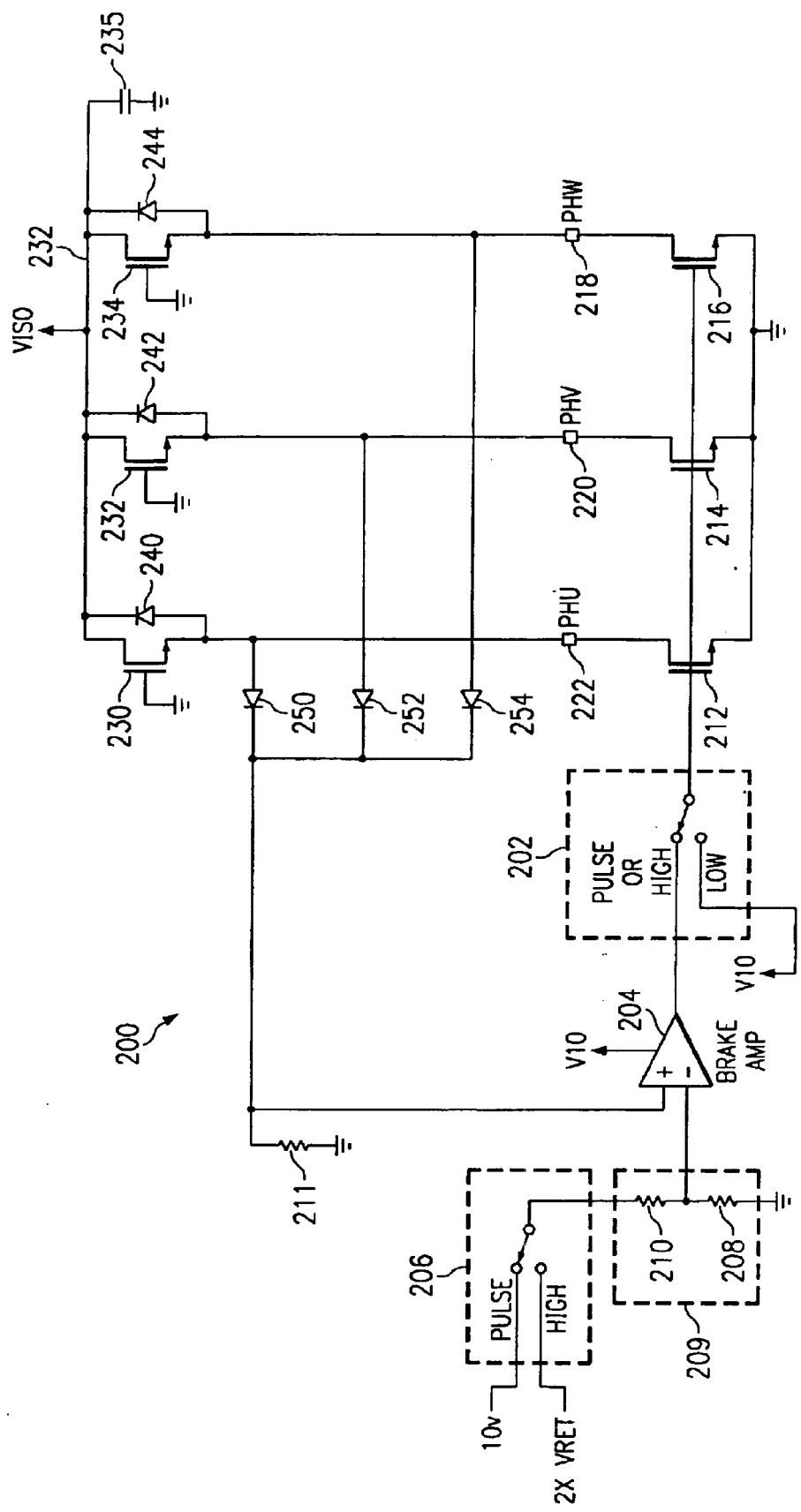
FIG. 2 illustrates a spindle motor control circuit used during retract.
Figure 7:
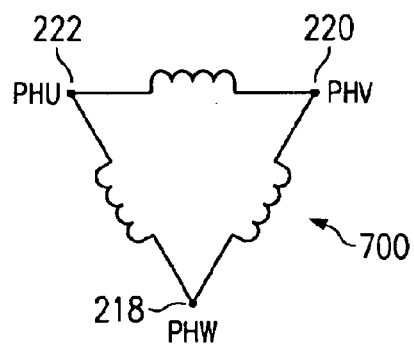
FIG. 7 illustrates a diagram of a spindle motor.

FIG. 2 illustrates the spindle motor control circuit 200 during the retract period. Switch 202 operates in accordance with the particular state during the retract period. During the pulse state or the high state the op amp 204 is connected to the gate of NFET 212, the gate of NFET 214 and to the gate of NFET 216. During the low state the gate of NFET 212, NFET 214 and the gate of NFET 216 is connected to voltage $V_{10}$ which shorts the terminal 222 terminal 220 and terminal 218 to ground. The terminal 218 and the terminal 220 and the terminal 222 as show in FIG. 7 connect the phases of the motor 700 shown connected in Δ. NFET 212, NFET 214 and NFET 216 are considered the low end switches while NFET 230, NFET 232 and NFET 234 are considered the high side switches for the spindle motor 700. FIG. 2 illustrates the gates of NFET 230, NFET 232 and NFET 234 connected to ground to keep these NFETs from conducting during the emergency operation. Terminal 222 is connected between the source of NFET 230 and the drain of NFET 212. Likewise terminal 220 is connected between the source of NFET 232 and the drain of NFET 214. The drain of transistor 230 is connected to the drain of transistor 232 and is connected to the drain of transistor 234. The drain of transistor NFET 230, the drain of NFET 232 and the drain of NFET 234 are connected to voltage $V_{ISO}$. Additionally, a parasitic diode 240 is connected between the drain and source of transistor 230. Diode 242, which is parasitic, is connected between the drain and source of transistor 232 and a parasitic diode 244 is connected between the drain and source of transistor 234. A capacitor 235 is connected to drains of transistors 230, 232 and 234. This capacitor maintains volts. The source of NFET 212, the source of NFET 214 and the source of NFET 216 is connected to ground. Terminal 222 connected to resistor 211 through diode 250, the terminal 220 is connected to resistor 211 through diode 252, and the terminal PHW 218 is connected to resistor 211 through diode 254. Additionally, the center point of a voltage dividing circuit 209 is connected to the negative input of operational amplifier 204. The voltage dividing circuit 209 includes resistor 208 connected to ground and connected to the center point of the voltage dividing circuit 209 and resistor 210 connected to the center point of voltage dividing circuit 209 and to switch 206. While in the low state, the gates of NFET 212, NFET 214 and NFET 216 are connected to voltage $V_{10}$. As the motor turns, voltages are generated within the coils and these voltages result in currents flowing to ground as a result of the shorted NFETs on the low end namely, NFET 212, NFET 214 and NFET 216. During the transition from the low state to the pulse state, switch 202 switches to connect the output of operational amplifier 204 to the gate of NFET 212, NFET 214 and NFET 216. Likewise, the switch 206 switches to the terminal to input voltage $V_{10}$. A reduced $V_{10}$ is input to the negative terminal of op amp 204. The reduced $V_{10}$ is a result of the voltage dividing circuit 209. The plus terminal of op amp 204 is essentially at ground. The op amp 204 outputs a voltage, which immediately opens NFET 212, NFET 214 and NFET 216 drain to source. Again since these NFETs are connected to large inductors, namely the windings of the spindle motor as illustrated in FIG. 7, these currents produce a large voltage which is known as a flyback voltage and overcome the threshold voltage of diode 240, the threshold voltage of diode 242 and the threshold voltage of 244. Consequently, the voltage $V_{ISO}$ increases sharply as a result of the flyback voltage. The increased voltage $V_{ISO}$ increases the voltage $V_{10}$. As the voltage at terminal 222, terminal 220 and terminal 218 approach the reduced voltage $V_{10}$, the voltage across resistor 211 increases, increasing the output from operational amplifier 204. At the end of the pulse state and the beginning of the high state, switch 206 switches to a new voltage $V2XV_{RET}$. This is generally a smaller voltage than $V_{10}$, and consequently the voltage at terminal 222, terminal 220 and terminal 218 is reduced to correspond to the new voltage as a result of the operation of op amp 204 and the feedback of the voltage of terminals 218, 220 and 222. At the end of the high period the switch 202 is switched to the low state and the voltage at gates of NFET 212, NFET 214 and NFET 216 rise to $V_{10}$ so that the switches short between the drain to source. As a consequence, the terminal 222, terminal 220 and terminal 218 are at ground and the motor 700 brakes at ground thus, the cycle can be repeated if desired. As mentioned above, FIG. 4 illustrates a circuit to generate voltage $V_{10}$. Voltage $V_{ISO}$ is input to diode 404, and the output of diode 404 is input to regulator 402, which generates the voltage $V_{10}$.

Figure 3:
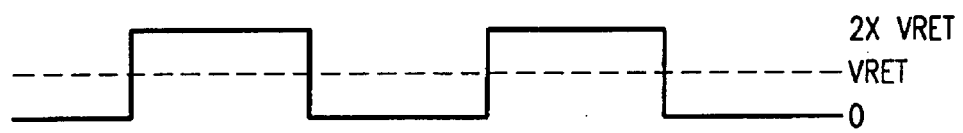
FIG. 3 illustrates a relationship between the signal $2XV_{RET}$ and Signal $V_{RET}$.

FIG. 3 illustrates the relationship between the voltage $V_{RET}$ and voltage $V2XV_{RET}$. The pulses which correspond to signal voltage $V2XV_{REC}$ has a fifty percent (50%) duty cycle and correspondingly has twice the magnitude of voltage $V_{RET}$.

Figure 6:
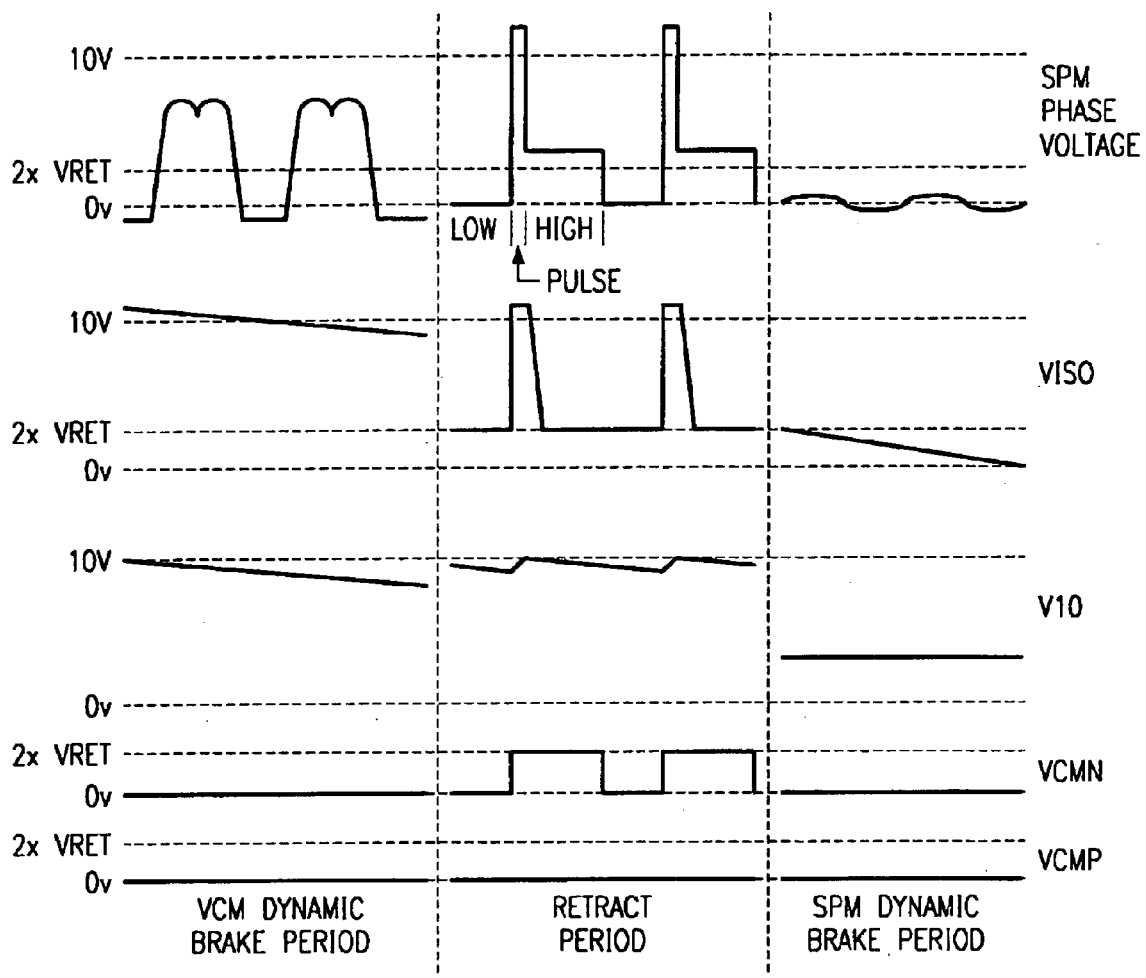
FIG. 6 illustrates the relationship between the different voltages.

Turning now to FIG. 6, FIG. 6 illustrates the SPM phase voltage at each of terminal 222, terminal 220 and terminal 218. Additionally, the voltage $V_{ISO}$ is illustrated. Voltage $V_{10}$ is illustrated as well as the voltage across the VCM motor VCMN and voltage VCMP. As illustrated in FIG. 6, the SPM voltage is zero during the low state, rises sharply during the pulse state and is reduced during the high state. The voltage $V_{ISO}$ increases sharply during the pulse state. The voltage $V_{10}$ decreases during the VCM dynamic brake and increases during the pulse state of the retract. Even though the spindle motor can be turning at a relatively low velocity, which occurs near the end of the power down stage, the high voltages as illustrated in FIG. 6 by the SPM phase voltage and the voltage $V_{ISO}$ during the pulse period can be achieved. The diodes 240 and 242 and 244 typically are parasitic drain to source diodes and it is necessary to place a capacitor across the VISO node for power supply during power interruption or power reductions. The present invention allows this capacitor 235 to be smaller in size since the pumping can force a larger voltage onto the capacitor in a short amount of time. Furthermore, the lower capacitance reduces the inrush of current through the diode and into the capacitor. During the low state the motor is braked by the shorting of the phasing to ground. Typically the dynamic brake of the voice coil motor VCM is performed for at least ten milliseconds. This dynamic brake shorts the connections of the servo arm coil, namely terminal $V_{CMN}$ and terminal $V_{CMP}$ together. The pulse state is begun and the voltage $V_{ISO}$ and the generated supply referred to as voltage $V_{10}$ are used for power. The retract period is terminated when the back EMF indicates that the motor has slowed to a desired speed or a counter can be used to provide a specific time for the retract period. Next, the spindle dynamic brake is initiated and the phases of the spindle motor (spm) are shorted together.

What is claimed is:

1. A spindle motor control circuit for controlling a motor; comprising;

a control circuit to control said motor during at least a low voltage state, a pulse voltage state and a high voltage state;

said motor braking during said low voltage state;

said control circuit receiving a flyback voltage from said motor during said pulse voltage state;

said control circuit receiving a reduced flyback voltage being smaller than said flyback voltage from said motor during said high voltage state.

2. A spindle motor control circuit for controlling a motor, as in claim 1, wherein said control circuit includes an op amp to feed back a voltage to limit said flyback voltage from said motor.

3. A spindle motor control circuit for controlling a motor, as in claim 1, wherein said voltage is a first voltage during said pulse voltage state and a second voltage during said high voltage state.

4. A spindle motor control circuit for controlling a motor, as in claim 3, wherein said first voltage is greater than said second voltage.

5. A spindle motor control circuit for controlling a motor, as in claim 1, wherein said motor is braked before said pulse voltage state and after said high voltage state.

* * * * *